(12) United States Patent
Maeng et al.

(10) Patent No.: US 10,691,995 B2
(45) Date of Patent: Jun. 23, 2020

(54) ANTENNA MODULE

(71) Applicant: AMOTECH CO., LTD., Namdong-gu, Incheon (KR)

(72) Inventors: Joo-Seung Maeng, Incheon (KR); Jin-Won Noh, Gwangju (KR); Eui-Jin Jung, Incheon (KR); Kil-Jae Jang, Seongnam-si (KR)

(73) Assignee: AMOTECH CO., LTD., Incheon (KR)

( * ) Notice: Subject to any disclaimer, the term of this patent is extended or adjusted under 35 U.S.C. 154(b) by 0 days.

(21) Appl. No.: 16/335,739

(22) PCT Filed: Sep. 22, 2017

(86) PCT No.: PCT/KR2017/010508
§ 371 (c)(1),
(2) Date: Mar. 22, 2019

(87) PCT Pub. No.: WO2018/056765
PCT Pub. Date: Mar. 29, 2018

(65) Prior Publication Data
US 2019/0236433 A1 Aug. 1, 2019

(30) Foreign Application Priority Data

Sep. 23, 2016 (KR) .................. 10-2016-0122443
Dec. 20, 2016 (KR) .................. 10-2016-0174983
Jun. 30, 2017 (KR) .................. 10-2017-0083818

(51) Int. Cl.
*G06K 19/077* (2006.01)
*H01Q 1/22* (2006.01)
(Continued)

(52) U.S. Cl.
CPC ... *G06K 19/07783* (2013.01); *G06Q 20/3278* (2013.01); *H01Q 1/22* (2013.01);
(Continued)

(58) Field of Classification Search
CPC ................................ G06K 19/07783
(Continued)

(56) References Cited

U.S. PATENT DOCUMENTS

2012/0208606 A1    8/2012  Kubo et al.
2013/0181805 A1*   7/2013  Saito .................... H01Q 1/2216
                                                            336/84 M
(Continued)

FOREIGN PATENT DOCUMENTS

JP    2013-115647 A    6/2013
KR    10-2012-0009473 A    2/2012
(Continued)

*Primary Examiner* — Allyson N Trail
(74) *Attorney, Agent, or Firm* — Baker & Hostetler LLP

(57) ABSTRACT

Disclosed is an antenna module, which forms a radiation pattern for near-field communication and a radiation pattern for electronic payment on a flexible printed circuit board, and then couples it with a magnetic sheet, thereby implementing the performance equal to or superior to that of a conventional antenna module while simplifying the manufacturing process. The disclosed antenna module includes a flexible magnetic sheet and an antenna sheet on which a radiation pattern and an insertion hole are formed, and the magnetic sheet is formed with an extension portion formed on one short side, and the extension portion is penetrated and inserted into the insertion hole to be coupled with the antenna sheet.

19 Claims, 19 Drawing Sheets

(51) Int. Cl.
  *H01Q 1/24*     (2006.01)
  *H01Q 7/06*     (2006.01)
  *H04M 1/02*     (2006.01)
  *H01Q 1/38*     (2006.01)
  *G06Q 20/32*    (2012.01)
  *H04B 5/00*     (2006.01)
  *H05K 1/02*     (2006.01)
  *H01Q 1/52*     (2006.01)
  *H05K 9/00*     (2006.01)
  *H01Q 17/00*    (2006.01)

(52) U.S. Cl.
  CPC ............ *H01Q 1/2216* (2013.01); *H01Q 1/24* (2013.01); *H01Q 1/242* (2013.01); *H01Q 1/38* (2013.01); *H01Q 1/52* (2013.01); *H01Q 1/526* (2013.01); *H01Q 7/06* (2013.01); *H01Q 17/00* (2013.01); *H04B 5/0031* (2013.01); *H04M 1/02* (2013.01); *H04M 1/0277* (2013.01); *H05K 1/028* (2013.01); *H05K 9/00* (2013.01)

(58) Field of Classification Search
  USPC .......................................................... 235/492
  See application file for complete search history.

(56) References Cited

U.S. PATENT DOCUMENTS

| | | | |
|---|---|---|---|
| 2014/0145906 A1* | 5/2014 | Kato | H01Q 7/00 |
| | | | 343/867 |
| 2017/0005399 A1* | 1/2017 | Ito | H01Q 7/06 |
| 2018/0089551 A1* | 3/2018 | Orihara | G06K 19/07 |
| 2019/0074577 A1* | 3/2019 | Kim | H04B 5/0025 |

FOREIGN PATENT DOCUMENTS

| | | |
|---|---|---|
| KR | 10-1607835 B1 | 3/2016 |
| KR | 10-1649259 B1 | 8/2016 |

* cited by examiner

| ITEMS | MEASURED SURFACE | Z-Y Plane @ X=0 | X-Y Plane @ Z=2cm |
|---|---|---|---|
| REAR COVER IN WHICH FIRST SLIT AND SECOND SLIT ARE FORMED (ANTENNA MODULE OF FIG. 2) | FRONT SURFACE | 141 POINTS | 57.58% |
| | REAR SURFACE | 149 POINTS | 62.75% |
| REAR COVER IN WHICH FIRST SLIT AND SECOND SLIT ARE FORMED (ANTENNA MODULE OF FIG. 12) | FRONT SURFACE | 147 POINTS | 62.09% |
| | REAR SURFACE | 127 POINTS | 48.37% |

FIG.20

| SECOND RADIATION PATTERN (NFC) | RECOGNITION DISTANCE | | | | | | | | LOAD MODULATION (mV) | | | |
|---|---|---|---|---|---|---|---|---|---|---|---|---|
| | Tag Mode (mm) | Reader Mode (mm) | | | | | | | | | | |
| | ACR(30) | ULC (Min.10) | Topaz (Min.20) | Ultra light (Min.20) | EV1 (Min.15) | MN910 (Min.20) | TecTiles (Min.15) | Athelia (Min.5) | 0,0,0 (8.8mV) | 1,0,0 (7.2mV) | 2,0,0 (5.6mV) | 3,0,0 (4.0mV) |
| REAR COVER IN WHICH FIRST SLIT AND SECOND SLIT ARE FORMED (ANTENNA MODULE OF FIG. 2) | 42 | 15 | 29 | 35 | 20 | 20 | 16 | 8 | 38.06 | 22.03 | 14.54 | 10.02 |
| REAR COVER IN WHICH FIRST SLIT AND THIRD SLIT ARE FORMED (ANTENNA MODULE OF FIG. 12) | 80 | 33 | 53 | 53 | 39 | 30 | 26 | 15 | 97.45 | 53.07 | 36.33 | 25.22 |

FIG.21

ANTENNA MODULE

CROSS-REFERENCE TO RELATED APPLICATIONS

This application is a National Stage of International patent application PCT/KR2017/010508, filed on Sep. 22, 2017, which claims priority to foreign Korean patent application No. KR 10-2016-0122443, filed on Sep. 23, 2016, Korean patent application No. 10-2016-0174983, filed on Dec. 20, 2016, and Korean patent application No. 10-2017-0083818, filed on Jun. 30, 2017, the disclosures of which are incorporated by reference in their entireties.

FIELD OF THE INVENTION

The present disclosure relates to an antenna module, and more particularly, to an antenna module embedded in a portable terminal to perform electronic payment and near-field communication.

BACKGROUND

With the development of technology, portable terminals such as mobile phones, PDAs, PMPs, navigation devices, and laptops provide the functions such as DMB, wireless internet, and near-field communication between the devices in addition to the basic functions such as calling, playing video/music, and navigation. Therefore, the portable terminal has a plurality of antennas for wireless communication such as wireless internet and Bluetooth.

In addition, in recent years, there is a tendency to apply the functions such as information exchange between the terminals, payment, ticket booking, and search by using near-field communication (i.e., NFC) to the portable terminal. For this purpose, the portable terminal is mounted with an antenna module (i.e., an NFC antenna module) used in a near-field communication method. At this time, the used NFC antenna module is a non-contact type near-field wireless communication module that uses a frequency band of about 13.56 MHz as one of the RFID tags, and transmits data between the terminals at a close distance of about 10 cm. The NFC, other than payment, is widely used for transmission of the product information at supermarkets or stores or the travel information for visitors, transportation, lock devices for access control, etc.

In addition, in recent years, as the function related to electronic payment using the portable terminal, such as Apple Pay and Samsung Pay, is required, an antenna for electronic payment is mounted on the portable terminal. For example, since Samsung Pay performs the electronic payment using a magnetic secure transmission method, a Magnetic Secure Transmission (MST) antenna is mounted on the portable terminal that supports Samsung Pay.

Meanwhile, as miniaturization and thinning required in the portable terminal market are required, the size and the thickness of the portable terminal are reduced, and the mounting space of the internal parts is being reduced.

Various types of antenna modules have been developed to minimize the area and the thickness according to such market demands.

However, there is a problem in that the MST antenna module used for the electronic payment is formed in the form of winding the coil, such that when the miniaturization and the thinning are made, a defect rate increases in manufacturing the antenna module due to various causes such as occurrence of short of a coil, the irregular winding due to vending, and the twist due to a thin material, and the performance of the antenna module is reduced.

In addition, there is a problem in that as the portable terminal is miniaturized, the mounting space becomes insufficient when a plurality of antennas are mounted therein at the same time. Therefore, the integrated antenna in which the near-field communication antenna and the MST antenna are integrally configured is required in the market.

Meanwhile, in the portable terminal using a metal material on the five surfaces of the side surface portion and the rear surface portion, a magnetic sheet having a wider area is required in order to implement the performance of the MST antenna at a certain level or more.

However, when the magnetic sheet of the antenna module becomes large, the magnetic sheet is disposed close to a geomagnetic sensor at the time of mounting it on the portable terminal. Therefore, there is a problem in that it is difficult to correct the distortion of the geomagnetic sensor caused by the magnetic influence of the magnetic sheet.

In order to solve this problem, a structure of reducing the area of the magnetic sheet to increase the spacing distance between the geomagnetic sensor and the magnetic sheet has been developed.

However, there is a problem in that when the area of the magnetic sheet is reduced, the distortion of the geomagnetic sensor can be corrected but the performance of the MST antenna module is reduced.

SUMMARY OF THE INVENTION

The present disclosure is intended to solve the above-described conventional problems, and an object of the present disclosure is to provide an antenna module, which forms a radiation pattern for near-field communication and a radiation pattern for electronic payment on a flexible printed circuit board, and then couples it with a magnetic sheet, thereby implementing the performance equal to or superior to that of a conventional antenna module while simplifying a manufacturing process.

In addition, another object of the present disclosure is to provide an antenna module, which flack-treats a part of the magnetic sheet disposed close to the geomagnetic sensor, thereby implementing the performance equal to or superior to that of the conventional antenna module while minimizing the influence on the geomagnetic sensor.

For achieving the objects, an antenna module according to an embodiment of the present disclosure includes a flexible magnetic sheet and an antenna sheet on which a radiation pattern and an insertion hole are formed, and the magnetic sheet is formed with an extension portion formed on one short side, and the extension portion is penetrated and inserted into the insertion hole to be coupled with the antenna sheet.

For achieving the objects, an antenna module according to another embodiment of the present disclosure includes, as the antenna module mounted on a portable terminal, an antenna sheet on which a first radiation pattern and a second radiation pattern are formed, a shielding sheet disposed on the front surface of the antenna sheet, and overlapped with the second radiation pattern, a magnetic sheet having one end portion disposed on the front surface and the rear surface of the antenna sheet through the antenna sheet, and having the other end portion disposed on the outside of the antenna sheet, and a first step compensating sheet disposed on the front surface of the magnetic sheet, and for compensating a step between the antenna sheet and the magnetic sheet.

According to the present disclosure, it is possible for the antenna module to form the radiation pattern for near-field communication and the radiation pattern for electronic payment on the flexible printed circuit board, and then to couple it with the magnetic sheet, thereby expanding the recognition region of the near-field communication and the electronic payment as compared with the conventional antenna module.

In addition, it is possible for the antenna module to secure the mounting space, and to implement the antenna performance equal to or superior to that of the conventional antenna module while simplifying the manufacturing and mounting processes.

In addition, it is possible for the antenna module to constitute the antenna by using the flexible member, thereby preventing the damage at the time of mounting it on the portable terminal, and easily mounting it even at the bent position.

In addition, it is possible for the antenna module to form the radiation pattern for near-field communication and the radiation pattern for electronic payment on the flexible printed circuit board, and then to couple it with the magnetic sheet, thereby simplifying the manufacturing process as compared with the conventional antenna module that winds the coil around the magnetic body.

That is, it is possible for the antenna module to omit the coil winding process including the coil winding, the coil insertion, the coil compression, the soldering, the cutting, the UV bonding, the UV curing, the terminal connection of the coil, etc. in the conventional process for manufacturing the antenna module that winds the coil, thereby simplifying the manufacturing process.

In addition, it is possible for the antenna module to form the radiation pattern for near-field communication and the radiation pattern for electronic payment on the flexible printed circuit board, and then to couple it with the magnetic sheet, thereby simplifying the manufacturing process and saving the costs because it is unnecessary to attach the insulating material in order to prevent the short between the magnetic body and the coil.

In addition, it is possible for the antenna module to form the protrusion region disposed close to the slit formed in the rear cover of the portable terminal on the magnetic sheet, and thereby to increase the amount of magnetic field emitted to the outside of the portable terminal to strongly form the radiation field, thereby improving the antenna performance.

In addition, it is possible for the antenna module to form the protrusion region disposed close to the slit formed in the rear cover of the portable terminal on the magnetic sheet to form the radiation field on the front surface and the rear surface of the portable terminal, thereby enabling the near-field communication on the front and rear surfaces of the portable terminal.

In addition, it is possible for the antenna module to dispose the step compensating sheet on the magnetic sheet and to compensate a step between the magnetic sheet and the antenna sheet to form the antenna module having a certain thickness, thereby easily mounting it on the portable terminal.

In addition, it is possible for the antenna module to form the hole in the step compensating sheet, thereby minimizing the generation of bubbles at the time of adhering the protective sheet and improving the flatness of the surface of the antenna module.

In addition, it is possible for the antenna module to remove some regions of the magnetic sheet overlapped with the geomagnetic sensor of the portable terminal, and then to dispose the step compensating sheet thereon, thereby preventing the occurrence of the interference of the geomagnetic sensor by the antenna module and preventing the reduction in the sensing performance of the geomagnetic sensor.

In addition, it is possible for the antenna module to dispose the supporting member on the front surface thereof to support the circuit board of the portable terminal, thereby firmly supporting the circuit board while preventing the reduction in the antenna performance.

In addition, it is possible for the antenna module to remove a part of the shielding sheet and to form the dummy region on the antenna sheet when the slit in the vertical direction is formed in the portable terminal, thereby preventing the reduction in the performance of the main antenna and the antenna module of the portable terminal.

In addition, it is possible for the antenna module to flake-treat a part of the magnetic sheet disposed close to the geomagnetic sensor, thereby implementing the performance equal to or superior to that of the conventional antenna module while minimizing the influence on the geomagnetic sensor.

BRIEF DESCRIPTION OF THE DRAWINGS

FIGS. 20 and 21 are diagrams for explaining the antenna characteristics of the antenna module according to an embodiment of the present disclosure.

DETAILED DESCRIPTION

Figure 1:
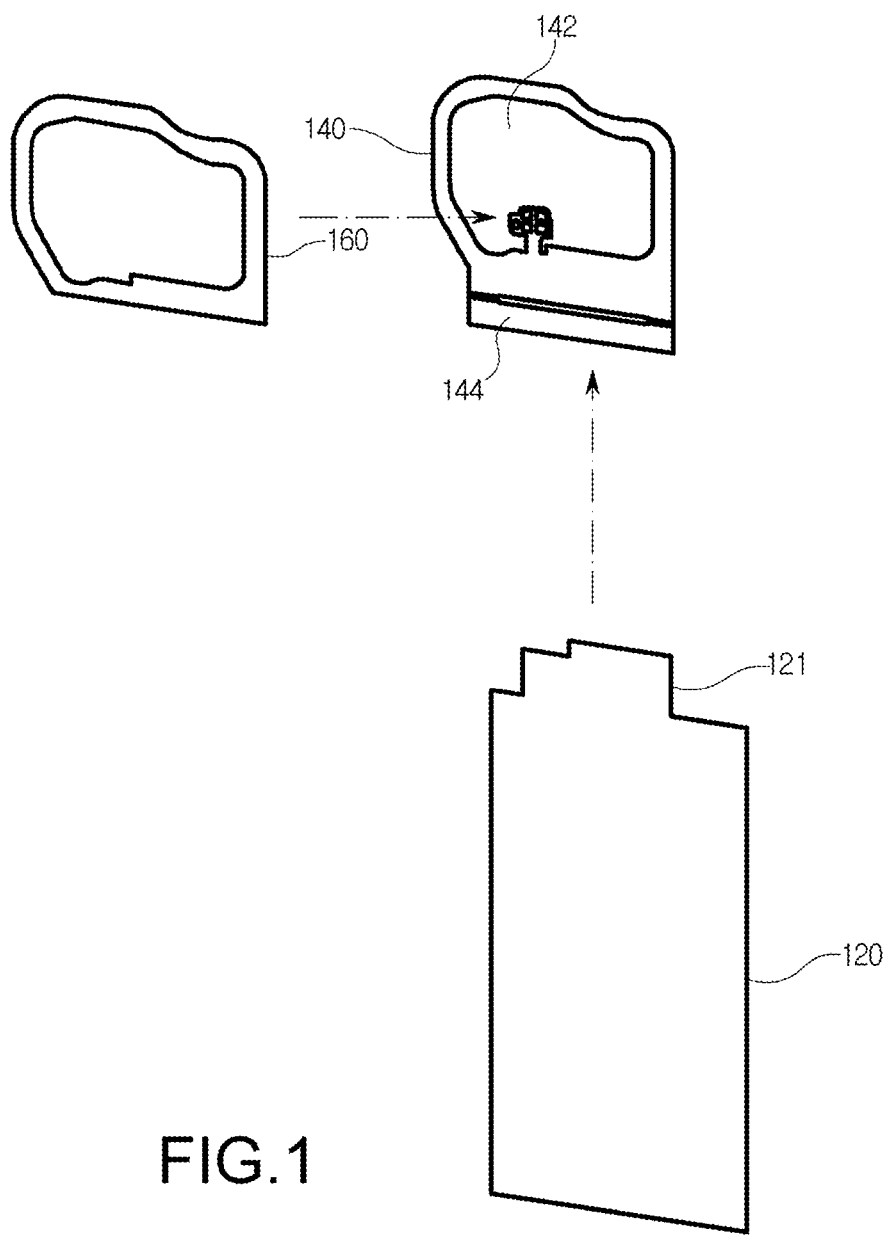
FIG. 1 is a diagram for explaining an antenna module according to a first embodiment of the present disclosure.

Hereinafter, the most preferred embodiment of the present disclosure will be described with reference to the accompanying drawings so that those skilled in the art to which the present disclosure pertains can easily practice the technical spirit of the present disclosure. First, in adding reference numerals to the components in each drawing, it is to be noted that the same components are denoted by the same reference numerals even though they are illustrated in different drawings. In addition, in the following description of the present disclosure, a detailed description of known configurations or functions will be omitted when it is determined to obscure the subject matter of the present disclosure.

Referring to FIG. 1, an antenna module according to a first embodiment of the present disclosure is configured to include a magnetic sheet 120, an antenna sheet 140, and a shielding sheet 160.

The magnetic sheet 120 operates as an auxiliary radiator of a radiation pattern formed on the antenna sheet 140. The magnetic sheet 120 is a plate-shaped base material or a film of a magnetic material. For example, the magnetic sheet 120 is one selected from a nanocrystalline alloy ribbon sheet, an iron-based amorphous ribbon sheet, and a ferrite sheet.

The iron-based amorphous sheet forms the characteristics such as magnetic permeability while curing the iron-based amorphous ribbon through a heat treatment process. At this time, the iron-based amorphous ribbon is, for example, an iron-based magnetic alloy, and the iron-based magnetic alloy can be a Fe—Si—B alloy. The iron-based magnetic alloy is preferably an alloy having the content of iron Fe of 73-80 at %, a sum of the contents of silicon Si and boron B of 15-26 at %, and a sum of the contents of copper Cu and niobium Nb of 1-5 at %.

Meanwhile, the heat treatment process forms an iron-based amorphous sheet by heating the iron-based amorphous ribbon at a temperature of about 300° C. to 500° C. for about 0.1 to 10 hours.

The nanocrystalline alloy ribbon sheet is, for example, an iron (Fe)-based magnetic alloy. The nanocrystalline alloy ribbon sheet forms the characteristics such as magnetic permeability while curing the iron-based amorphous ribbon through the heat treatment process like iron-based amorphous sheet. At this time, the iron-based amorphous ribbon is, for example, the iron-based magnetic alloy, and the iron-based magnetic alloy can be a Fe—Si—B—Cu—Nb alloy. In this case, the iron-based magnetic alloy can be an alloy having the content of iron Fe is 73-80 at/o, a sum of the contents of silicon Si and boron B of 15-26 at %, a sum of the contents of copper Cu and niobium Nb of 1-5 at %.

Meanwhile, the heat treatment process forms a nanocrystalline sheet in which nanocrystalline has been formed by heating the iron-based amorphous ribbon at a temperature of about 300° C. to 700° C. for about 30 minutes to 2 hours.

When the magnetic sheet 120 is formed in a hard state by the heat treatment, it is difficult to mount it at a position where the magnetic sheet 120 is damaged or bent at the time of mounting it on the portable terminal.

Therefore, the magnetic sheet 120 is preferably in a flexible state that does not perform the heat treatment for the nanocrystalline alloy ribbon sheet, the iron-based amorphous ribbon sheet, the ferrite sheet, etc.

The magnetic sheet 120 has an adhesive sheet (not illustrated) for adhering the antenna module adhered to the portable terminal. The magnetic sheet 120 has the adhesive sheet (not illustrated) adhered to one surface facing the portable terminal. The magnetic sheet 120 can have a protective sheet adhered to the other surface thereof when the adhesive sheet is adhered to one surface thereof.

The magnetic sheet 120 can have an extension portion 121 in a predetermined shape penetrated and inserted into the antenna sheet 140. The extension portion 121 is formed to extend outwardly at one short side of the magnetic sheet 120. The extension portion 121 can be formed so that one side parallel to the short side of the magnetic sheet 120 has a length (width) shorter than the short side of a base board.

Figure 3:
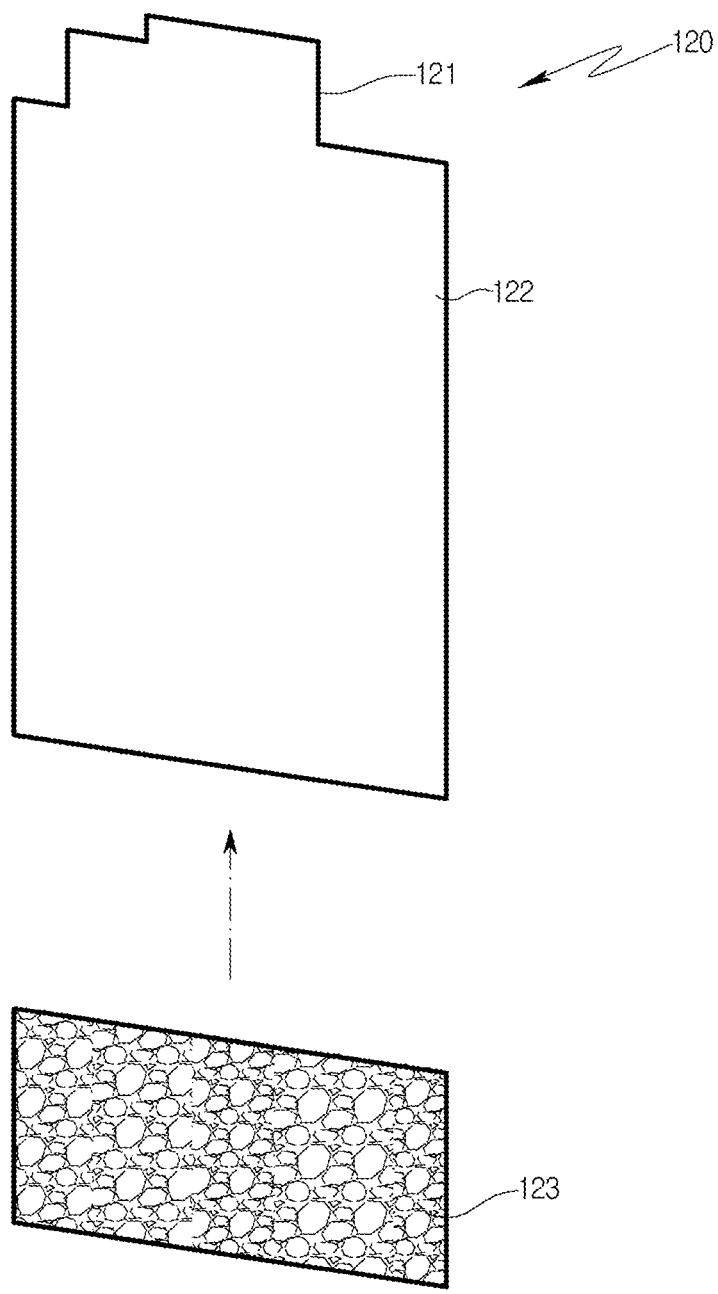

Referring to FIG. 3, a part of the magnetic sheet 120 can be formed to be separated into fine pieces through flake-treatment. When the antenna module is mounted on the portable terminal, the magnetic sheet 120 flake-treats a predetermined region of one end portion disposed close to a geomagnetic sensor 220 to be separated into fine pieces.

The flake-treatment is performed by adhering the protective sheet to at least one surface on which the adhesive sheet has not been adhered of both surfaces of the magnetic sheet 120 at the time of the flake-treatment. At this time, pressure is applied to only some regions of the magnetic sheet 120 by using a roller, etc. at the time of the flake-treatment to be separated into fine pieces. However, it is not limited thereto, and in addition, pressure can be applied to only some regions thereof to be separated into fine pieces after the protective sheet is adhered to one surface of the magnetic sheet 120.

The magnetic sheet 120 can be divided into a first region 122 that has not been subject to the flake-treatment and a second region 123 that has been subject to the flake-treatment. The second region 123 is formed by being separated into non-uniform fine pieces, and is formed in the area narrower than the first region 122. At this time, the second region 123 can be formed to have the area of about 30% or less of the entire area (i.e., the area including the first region 122 and the second region 123).

Meanwhile, referring to FIG. 3, the magnetic sheet 120 can be formed by being separated into the first region 122 and the second region 123. That is, the magnetic sheet 120 can be formed by bonding the first region 122 that has not been subjected to the flake-treatment and the second region 123 that has been subject to the flake-treatment. At this time, the first region 122 and the second region 123 can be formed of the same material, or can be formed of different materials from each other.

The second region 123 is formed by being separated into fine pieces through the flake-treatment. The second region 123 is coupled to one end of the first region 122. At this time, as the antenna module is mounted on the portable terminal, the second region 123 can be disposed at a position close to the geomagnetic sensor 220.

Figure 4:
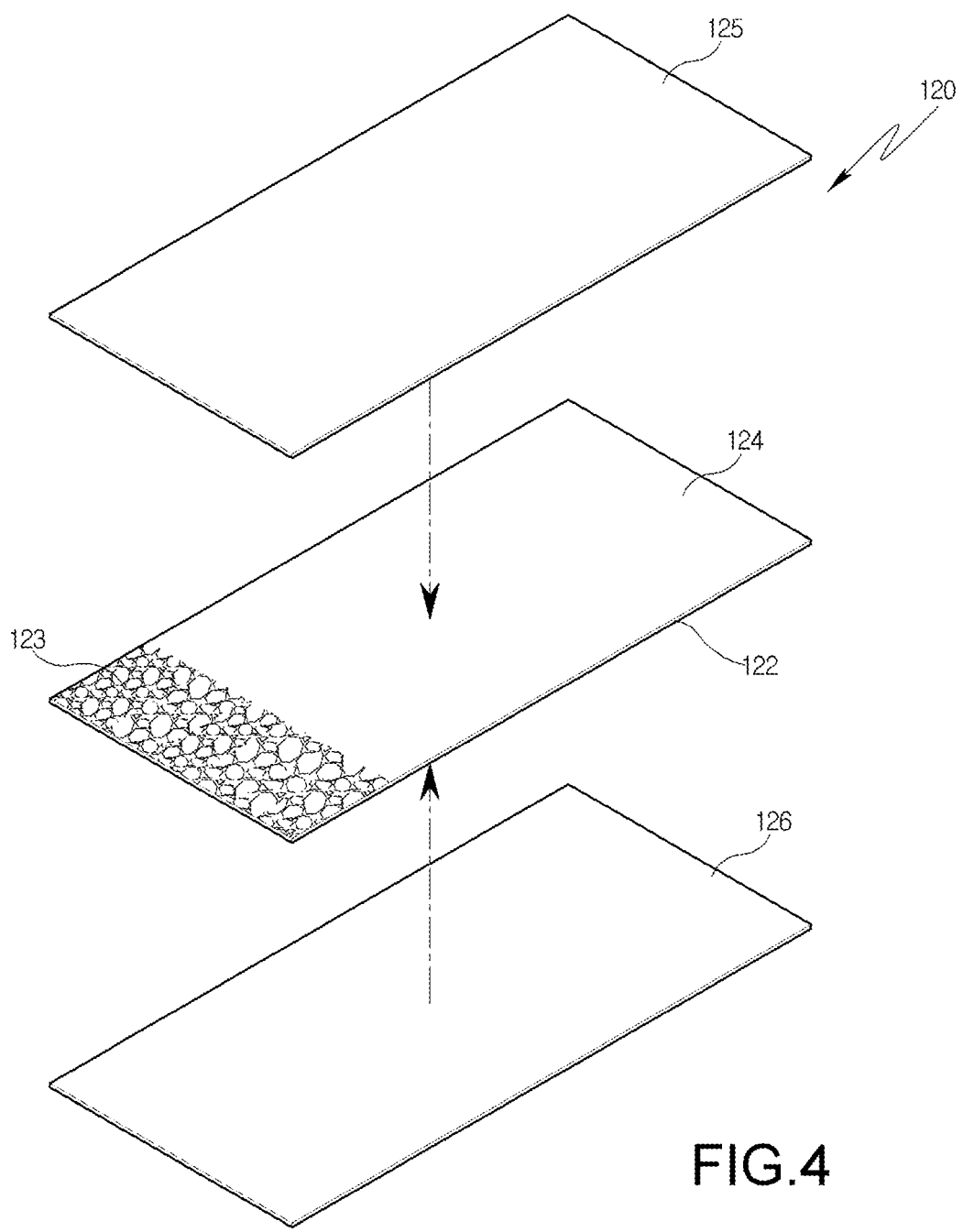
Figure 5:
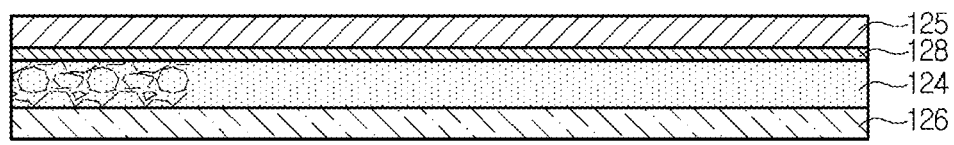

For example, referring to FIGS. 4 and 5, the magnetic sheet 120 can further include a thin plate magnetic sheet 124, a protective film 125, and a release film 126. The thin plate magnetic sheet can be composed of a single sheet, or can be composed of a multilayer structure in which a plurality of sheets are stacked. The thin plate magnetic sheet is, for example, one selected from a nanocrystalline alloy ribbon sheet, an iron-based amorphous ribbon sheet, and a ferrite sheet.

The thin plate magnetic sheet 124 is composed of any one of a nanocrystalline sheet and an iron-based amorphous sheet. At this time, the thin plate magnetic sheet 124 can also be configured by stacking any one of the nanocrystalline sheet and the iron-based amorphous sheet by two or more layers.

The thin plate magnetic sheet 124 can have the protective film 125 formed on one surface thereof. At this time, an adhesive layer 128 (or an adhesive sheet) can be formed between the protective film 125 and the thin plate magnetic sheet 124.

The thin plate magnetic sheet 124 can also have the release film 126 formed on the other surface thereof. That is, the thin plate magnetic sheet 124 can have the release film 126, which is removably attached, formed on the other surface facing one surface on which the protective film 125 is formed.

The thin plate magnetic sheet 124 at least partially overlaps with the antenna sheet 140, and performs the flake-treatment only on the region that has not been overlapped with the radiation pattern. Therefore, the thin plate magnetic sheet 124 can be divided into the first region 122 that has not been subjected to the flake-treatment and the second region 123 that has been subject to the flake-treatment. At this time, the first region 122 is formed to have the area wider than the second region 123. The second region 123 is disposed at a position close to the geomagnetic sensor 220 as the antenna module is mounted on the portable terminal.

Figure 2:
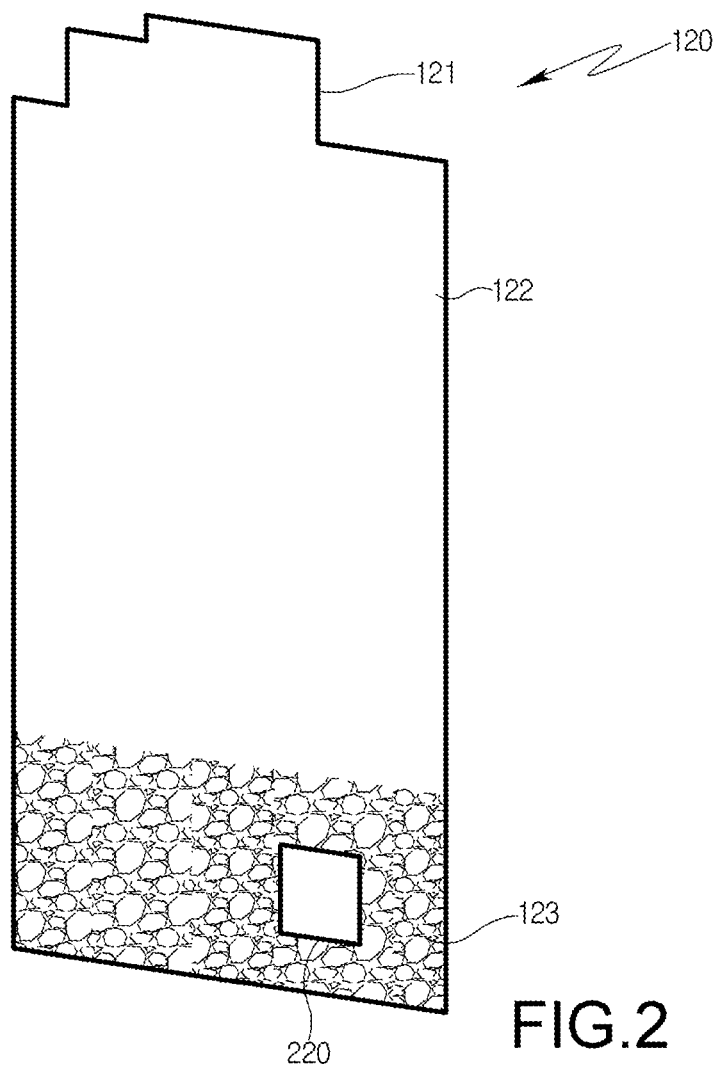
FIGS. 2 to 7 are diagrams for explaining a magnetic sheet of FIG. 1.

As illustrated in FIGS. 2 and 3, as a part of the magnetic sheet 120 is subject to the flake-treatment, the magnetic permeability is reduced and the saturation magnetic field is increased as compared with before the flake-treatment.

The magnetic sheet 120 can have the reduction in the magnetic hysteresis due to the reduction in the magnetic permeability and the increase in the saturation magnetic field, thereby minimizing the influence on the geomagnetic sensor 220 caused by the magnetic field generated in the antenna module.

At the same time, it is possible to minimize the reduction in the area of the magnetic sheet 120, thereby implementing the performance equal to or superior to that of the antenna module before the flake-treatment.

The antenna sheet 140 is formed with a radiation pattern for electronic payment and a radiation pattern for near-field communication. The antenna sheet 140 has the magnetic sheet 120 penetrated and inserted therein through an insertion hole 144 formed inside the radiation pattern for electronic payment to be coupled with the magnetic sheet 120.

The antenna sheet 140 can be a flexible printed circuit board having the radiation pattern formed on at least one surface of the upper surface and the lower surface thereof. At this time, the radiation pattern can include the radiation pattern for near-field communication and the radiation pattern for electronic payment.

The antenna sheet 140 has a loop hole 142 and the insertion hole 144 formed therein to be spaced apart from each other. At this time, the loop hole 142 can be formed in a polygonal shape such as a rectangular shape or a circular shape. The insertion hole 144 can be formed in a slit shape. Herein, when the antenna module is mounted on the rear cover of the portable terminal, a hole (e.g., a camera hole, an illumination hole, etc.) formed in the rear cover can be disposed in the loop hole 142.

The radiation pattern for near-field communication is formed in a loop shape that is wound in plural times along the outer circumference of the loop hole 142 of the flexible printed circuit board. At this time, the radiation pattern for near-field communication is formed only on one surface of the flexible printed circuit board.

The radiation pattern for electronic payment is formed in a loop shape that is wound in plural times along the outer circumference of the insertion hole 144 of the flexible printed circuit board. At this time, the radiation pattern for electronic payment can be formed on one surface or both surfaces of the flexible printed circuit board.

The radiation pattern for electronic payment is preferably formed on the other surface facing one surface on which the radiation pattern for near-field communication is formed when being formed only on one surface thereof. At this time, the radiation pattern for electronic payment can also be formed by winding in plural times around the outer circumference of the insertion hole 144 and then winding at least once around the outer circumference of the loop hole 142.

When the radiation pattern for electronic payment is formed on both surfaces thereof, one end of the radiation pattern for electronic payment formed on one surface of the flexible printed circuit board is connected to one end of the radiation pattern for electronic payment formed on the other surface through a via hole. At this time, the radiation pattern for electronic payment formed on one surface on which the radiation pattern for near-field communication has not been formed can also be formed by winding in plural times around the outer circumference of the insertion hole 144 and then winding at least once around the outer circumference of the loop hole 142.

The antenna sheet 140 can be formed with a terminal portion extending from the flexible printed circuit board. At this time, the terminal portion can be formed with a plurality of terminals connected to both ends of the radiation pattern for near-field communication and both ends of the radiation pattern for electronic payment, respectively. Herein, the terminal portion is preferably formed to extend into the loop hole 142 in order to minimize the mounting space of the antenna module.

The shielding sheet 160 is adhered to one surface of the antenna sheet 140. At this time, the shielding sheet 160 is adhered to one surface on which the radiation pattern for near-field communication has not been formed.

The shielding sheet 160 is disposed to overlap with the radiation pattern for near-field communication. The shielding sheet 160 can be formed to cover only the region where the radiation pattern for near-field communication has been formed in the antenna sheet 140.

Figure 6:
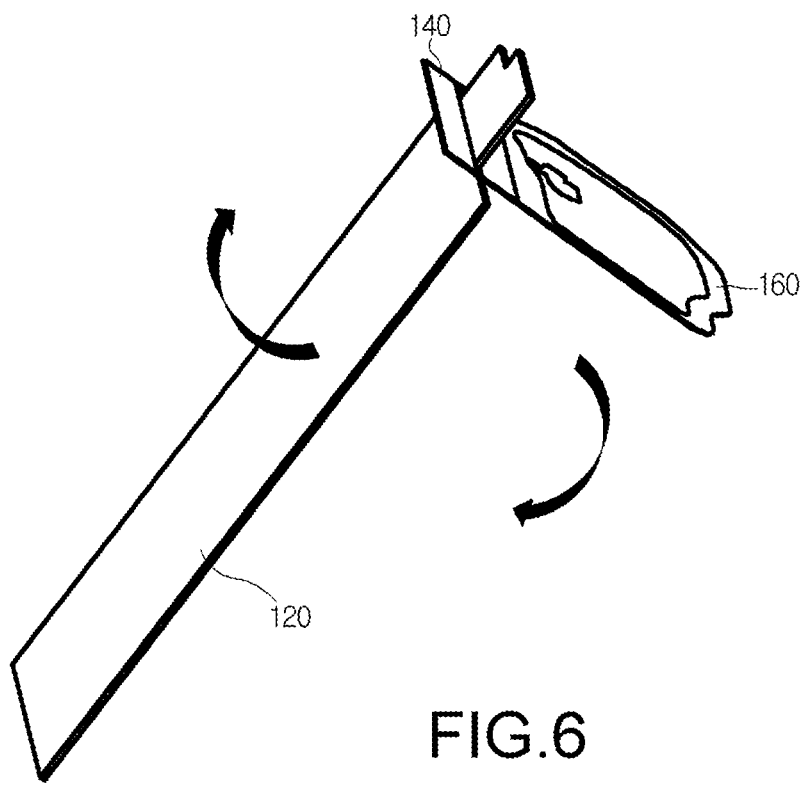

Referring to FIG. 6, the magnetic sheet 120 has the insertion hole 144 of the antenna sheet 140, to which the shielding sheet 160 has been adhered, penetrated and inserted into one surface thereof. The extension portion 121 of the magnetic sheet 120 is penetrated and inserted into the insertion hole 144 of the magnetic sheet 120. The magnetic sheet 120 is vertically (i.e., 90 degrees) coupled to the antenna sheet 140.

The magnetic sheet 120 and the antenna sheet 140 are flattened by rotating the magnetic sheet 120 clockwise. The magnetic sheet 120 and the antenna sheet 140 can also be flattened by rotating the antenna sheet 140 counterclockwise. The magnetic sheet 120 and the antenna sheet 140 are coupled through a lamination process. The antenna sheet 140 and the magnetic sheet 120 can be bonded through the adhesive agent interposed in the overlapping region.

Figure 7:
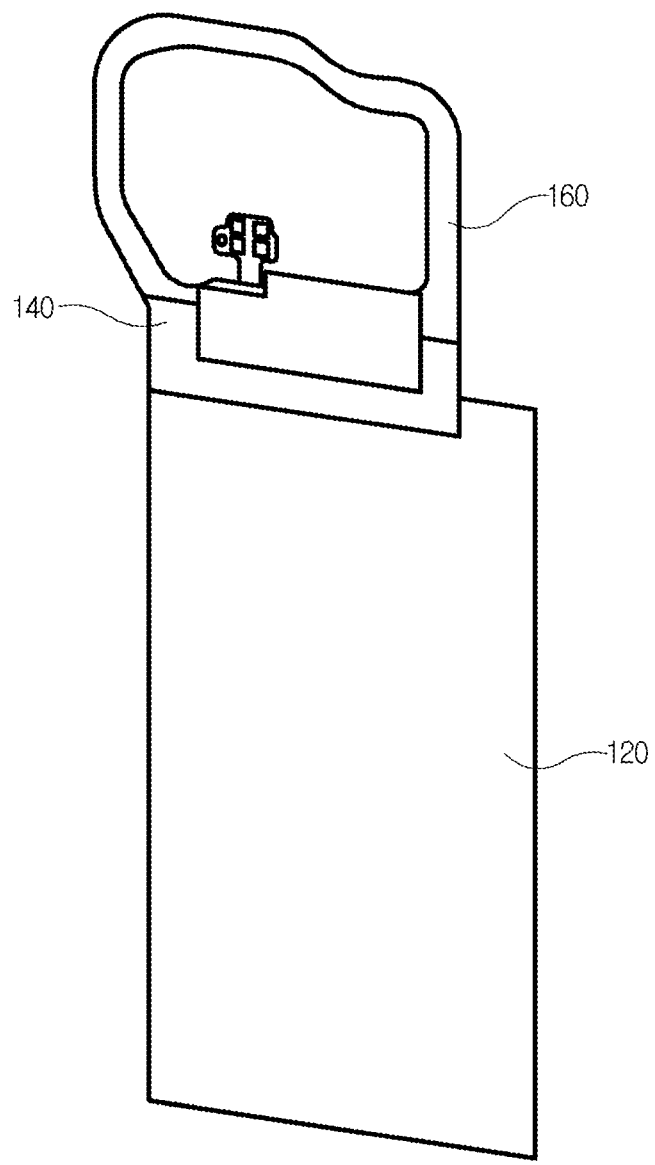

Referring to FIG. 7, as the magnetic sheet 120 and the antenna sheet 140 are coupled to each other, the magnetic sheet 120 is partially overlapped with the radiation pattern for electronic payment and the radiation pattern for near-field communication. The magnetic sheet 120 operates as an auxiliary radiator of the radiation pattern for electronic payment and the radiation pattern for near-field communication by the electromagnetic coupling effect generated in the region overlapped with the radiation patterns (i.e., the radiation pattern for electronic payment and the radiation pattern for near-field communication). Herein, the electromagnetic coupling effect means that the radiation pattern and the magnetic sheet 120 are electromagnetically coupled in a state where they are not directly connected (i.e., spaced apart from each other).

Figure 8:
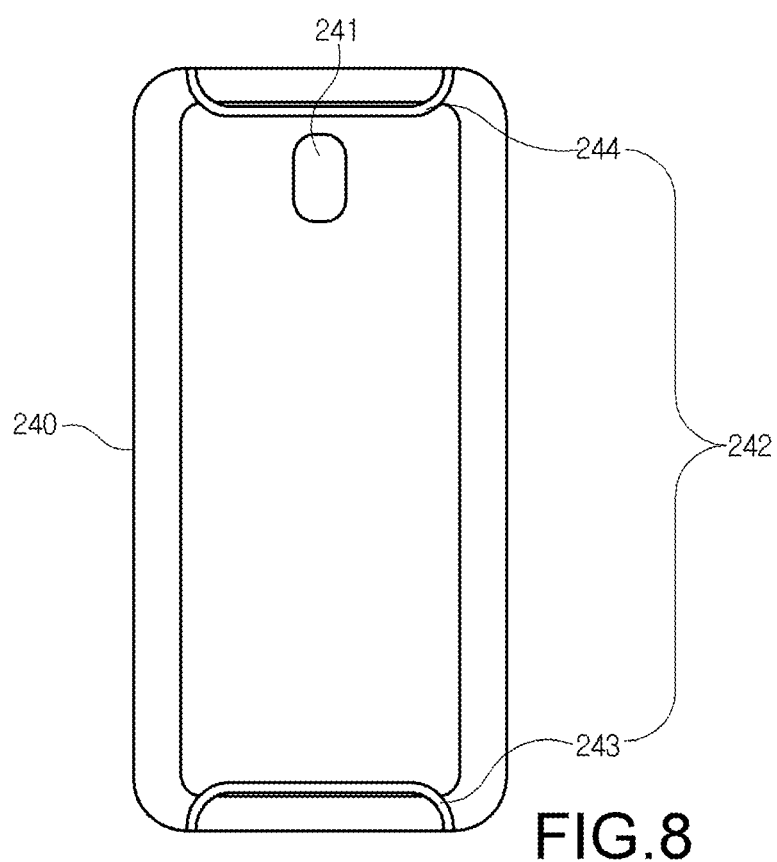
FIGS. 8 and 9 are diagrams for explaining a portable terminal applying the antenna module according to an embodiment of the present disclosure.
Figure 9:
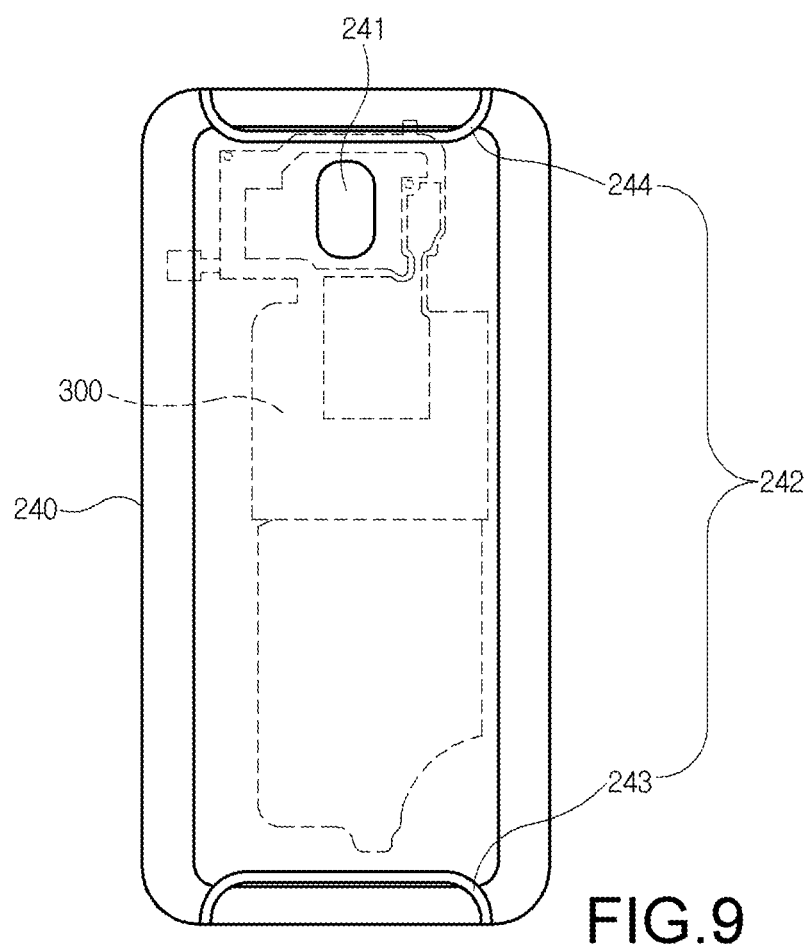

Referring to FIGS. 8 and 9, a slit 242 (or a segment) for passing through the magnetic field of the radiation pattern is formed in a rear cover 240 of the portable terminal in order to form the radiation fields for electronic payment and near-field communication. At this time, the rear cover 240 can be formed with a first slit 243 formed close to one short side thereof and a second slit 244 formed between a camera hole 241 and the other short side thereof. Herein, the camera hole 241 means a hole in which at least one of a camera and an illumination disposed on the rear surface of the portable terminal is disposed.

An antenna module 300 according to an embodiment of the present disclosure is mounted on the rear cover 240 of the portable terminal. At this time, one end of the antenna module 300 is disposed to be spaced at a predetermined interval apart from the first slit 243, and the other end of the antenna module 300 is disposed to be partially overlapped with the second slit 244.

Figure 10:
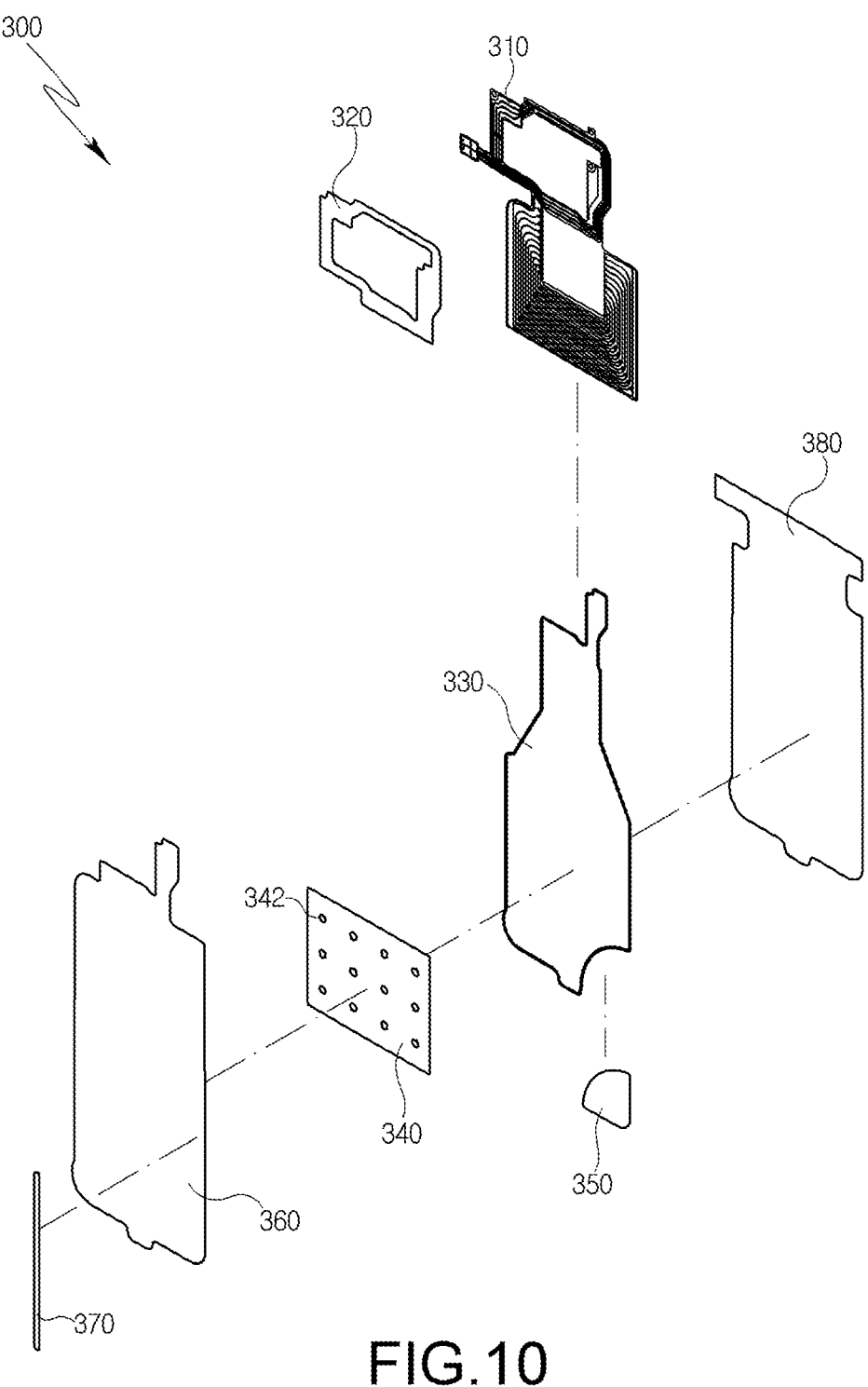
FIGS. 10 and 11 are diagrams for explaining the antenna module according to an embodiment of the present disclosure.
Figure 11:
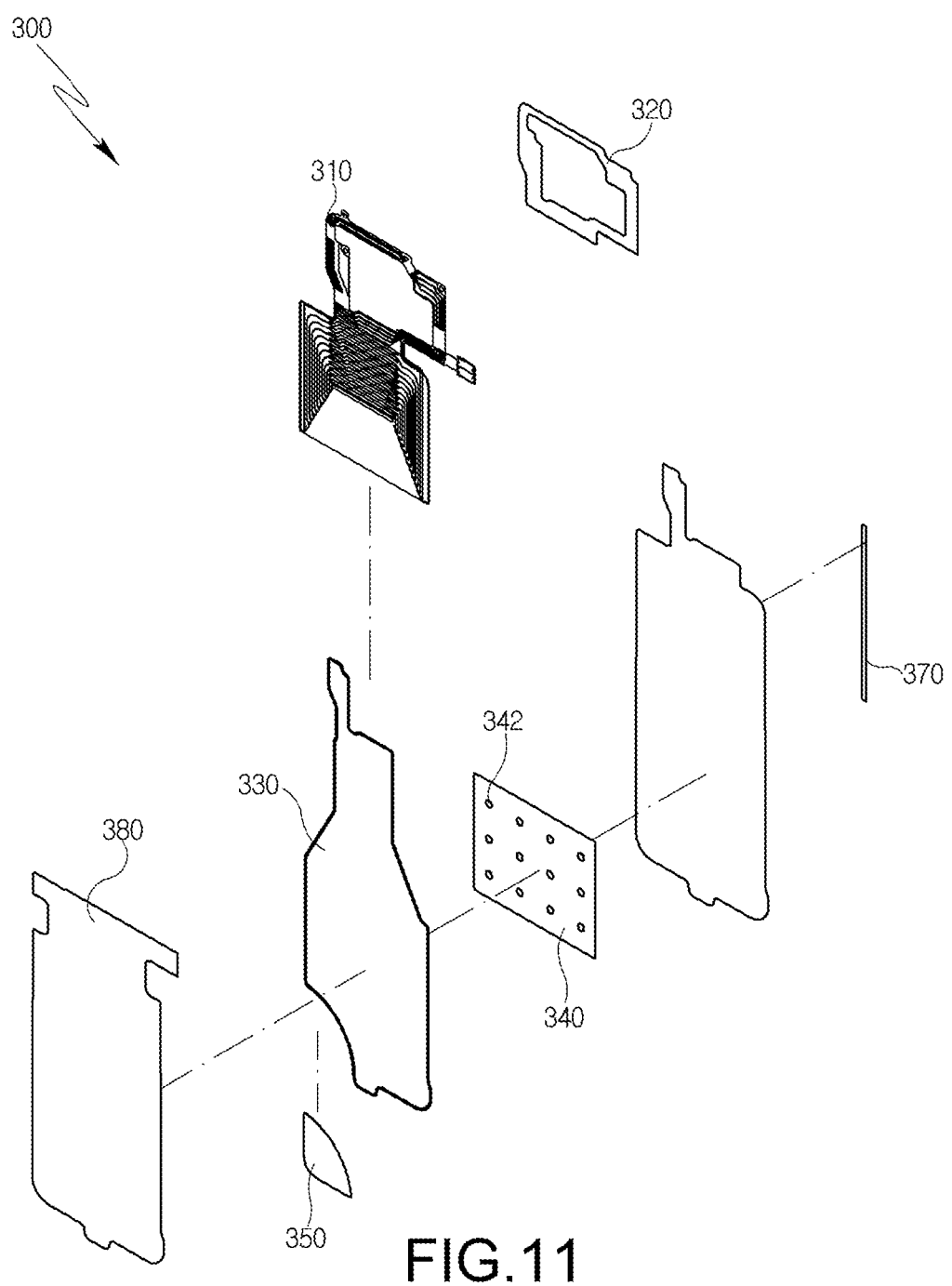

Referring to FIGS. 10 and 11, the antenna module 300 according to an embodiment of the present disclosure is configured to include an antenna sheet 310, a shielding sheet 320, a magnetic sheet 330, a first step compensating sheet 340, a second step compensating sheet 350, a protective sheet 360, a third step compensating sheet 370, and an adhesive sheet 380. Hereinafter, it can be understood that a front surface means one surface in the direction toward the inside of the portable terminal (i.e., the direction of a main body), and a rear surface means the other surface in the direction toward the outside of the portable terminal (i.e., the direction of the rear cover 240).

Figure 12:
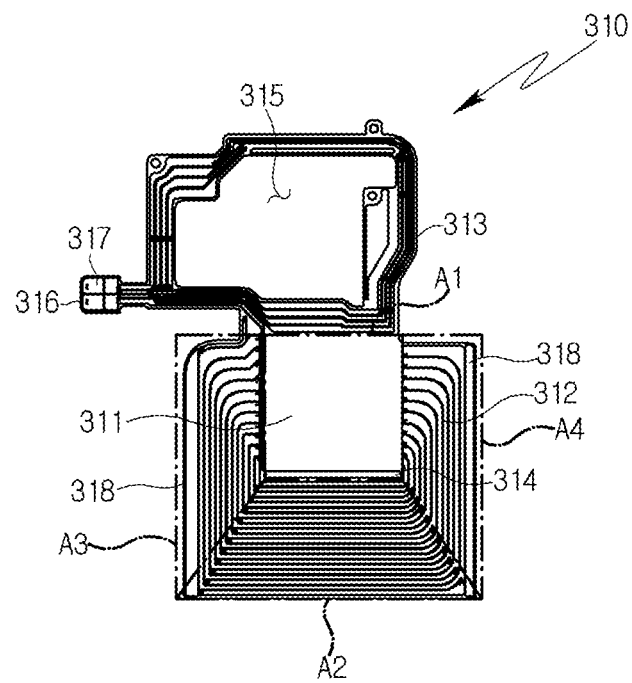
FIGS. 12 and 13 are diagrams for explaining an antenna sheet of FIG. 10.
Figure 13:
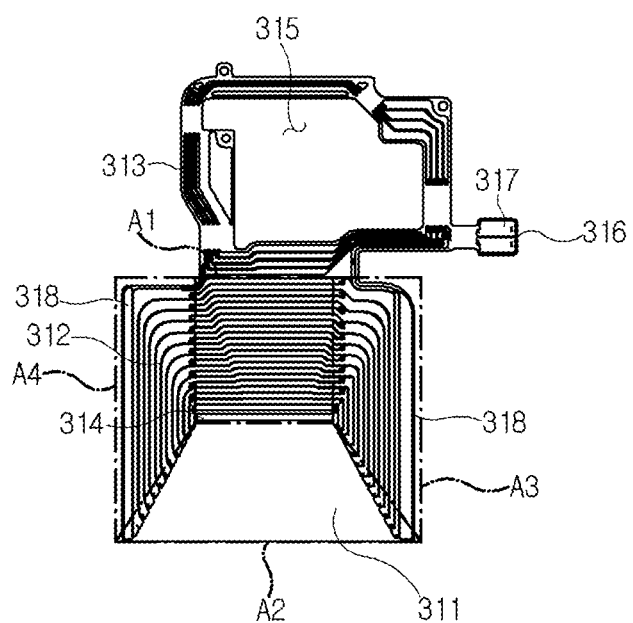

Referring to FIGS. 12 and 13, the antenna sheet 310 is composed of a flexible board 311 on which a first radiation pattern 312 and a second radiation pattern 313 are formed. At this time, for example, the first radiation pattern 312 is the radiation pattern for electronic payment (e.g., Magnetic Secure Transmission (MST)), and the second radiation pattern 313 is the radiation pattern for near-field communication (e.g., NFC).

The flexible board 311 can be formed of the flexible materials such as Polyimide (PI), Polyethylene phthalate (PET), and Thermoplastic PolyUrethane (TPU).

The flexible board 311 has an insertion hole 314 and a receiving hole 315 formed therein to be spaced apart from each other. At this time, the insertion hole 314 is a hole into which the magnetic sheet 330 is penetrated and inserted, and can be formed in a slit 242 shape having a long side and a short side. The receiving hole 315 is a hole in which the hole (e.g., the camera hole 241) formed in the rear cover 240 of the portable terminal is received, and can be formed in various shapes according to the portable terminal on which the antenna module 300 is mounted.

The first radiation pattern 312 is formed in a loop shape winding in plural times around the outer circumference of the insertion hole 314 of the flexible board 311. At this time, the first radiation pattern 312 can be formed on at least one surface of the front surface and the rear surface of the flexible board 311.

At this time, in the flexible board 311, a region where the first radiation pattern 312 is formed can be divided into a first region A1, a second region A2, a third region A3, and a fourth region A4 according to the relative position with the insertion hole 314 and whether to overlap with the magnetic sheet 330.

The first region A1 is a region that is disposed on the upper portion of the insertion hole 314, and where the magnetic sheet 330 is overlapped on the rear surface thereof. At this time, the first region A1 is formed with the first radiation pattern 312 only on the front surface that is not overlapped with the magnetic sheet 330.

The second region A2 is a region that is disposed on the lower portion of the insertion hole 314, and where the magnetic sheet 330 is overlapped on the front surface thereof. At this time, the second region A2 is formed with the first radiation pattern 312 only on the rear surface that is not overlapped with the magnetic sheet 330.

The third region A3 and the fourth region A4 are regions that are disposed to face each other on the side portions of the insertion hole 314, and are not overlapped with the magnetic sheet 330. At this time, since the width (i.e., D) of the insertion hole 314 is formed as widely as possible in order to increase the performance of the first radiation pattern 312 (i.e., performance for electronic payment), the third region A3 and the fourth region A4 become relatively narrow. That is, the area capable of forming the first radiation pattern 312 becomes narrow.

When the first radiation pattern 312 is formed in the third region A3 and the fourth region A4 with the same number of turns as in the first region A1 and the second region A2, the line width of the first radiation pattern 312 is narrowed, thereby increasing the resistance and reducing the antenna performance.

Therefore, the third region A3 and the fourth region A4 have the first radiation pattern 312 formed on the front surface and the rear surface thereof. At this time, the first radiation pattern 312 formed in the third region A3 and the fourth region A4 reduces the number of turns by a half, and increases the line width, thereby minimizing the resistance as compared with the first radiation pattern 312 formed in the first region A1 and the second region A2.

The first radiation patterns 312 disposed on the front surface and the rear surface of the flexible board 311 are connected to each other through the via hole to constitute the electronic payment antenna in a loop shape winding around the insertion hole 314.

When being formed only on one surface of the flexible board 311, the first radiation pattern 312 can be formed on the other surface facing one surface on which the second radiation pattern 313 has been formed. For example, when the first radiation pattern 312 is formed on the front surface of the flexible board 311, the second radiation pattern 313 is formed on the rear surface of the flexible board 311.

For example, when being formed on both surfaces (i.e., the front surface and the rear surface) of the flexible board 311, the first radiation pattern 312 is composed of a plurality of patterns disposed on the front surface and the rear surface of the flexible board 311, respectively, and each pattern is connected to another pattern formed on the facing surface through the via hole to constitute the first radiation pattern 312.

The second radiation pattern 313 is formed in a loop shape winding in plural times around the outer circumference of the receiving hole 315 of the flexible board 311. At this time, the second radiation pattern 313 can be formed in a loop shape winding the outer circumference of the receiving hole 315 on the front surface or the rear surface of the flexible board 311.

The second radiation pattern 313 can be composed of a plurality of patterns to be also formed in a loop shape winding in plural times around the outer circumference of the receiving hole 315 on the front surface and the rear surface of the flexible board 311. At this time, for example, the plurality of patterns are disposed to be spaced apart from each other on the front surface and the rear surface of the flexible board 311, and each pattern is connected to another pattern formed on the facing surface through the via hole to constitute the second radiation pattern 313.

The antenna sheet 310 can also be configured to further include a terminal portion 316 for connecting the first radiation pattern 312 and the second radiation pattern 313 to the main circuit board of the portable terminal. At this time, the terminal portion 316 includes a plurality of terminals 317 connected to both ends of the first radiation pattern 312 and both ends of the second radiation pattern 313, respectively, and is formed to extend from one side of the flexible board 311.

Figure 14:
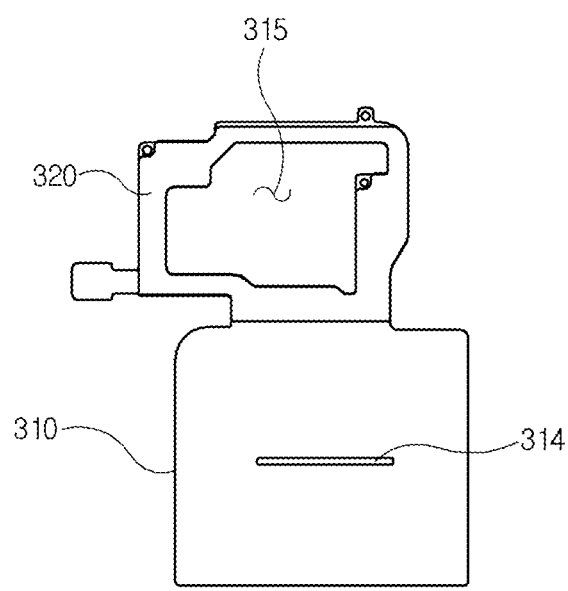
FIG. 14 is a diagram for explaining a shielding sheet of FIG. 10.

Referring to FIG. 14, the shielding sheet 320 is adhered to the front surface of the antenna sheet 310. At this time, the shielding sheet 320 is adhered to the front surface of the antenna sheet 310 so that the radiation pattern of the antenna sheet 310 forms a radiation field in the rear surface direction of the portable terminal. The shielding sheet 320 is formed to cover the region where the second radiation pattern 313 has been formed in the antenna sheet 310, and a hole corresponding to the receiving hole 315 of the antenna sheet 310 is formed therein.

The magnetic sheet 330 is an auxiliary radiator of the first radiation pattern 312 formed on the antenna sheet 310, and can be formed of a thin film metal. At this time, the magnetic sheet 330 is, for example, formed of one metal material selected from a nanocrystalline alloy, an iron-based amorphous alloy, and ferrite. Herein, the nanocrystalline alloy is, for example, a Fe-based magnetic alloy, and the Fe-based magnetic alloy can use a Fe—Si—B—Cu—Nb alloy. In this case, it is preferable that Fe is 73-80 at %, a sum of Si and B is 15-26 at %, and a sum of Cu and Nb is 1-5 at %.

The magnetic sheet 330 is formed of a metal material in a flexible state that does not perform the heat treatment. That is, when the magnetic sheet 330 is formed in a hard state by heat-treating a metal material, the magnetic sheet 330 is damaged in a process of mounting the antenna module 300 on the portable terminal, and thereby the antenna performance is reduced or it is difficult to mount it at a bent position, such that the magnetic sheet 330 is preferably in a flexible state that does not perform the heat treatment.

Figure 15:
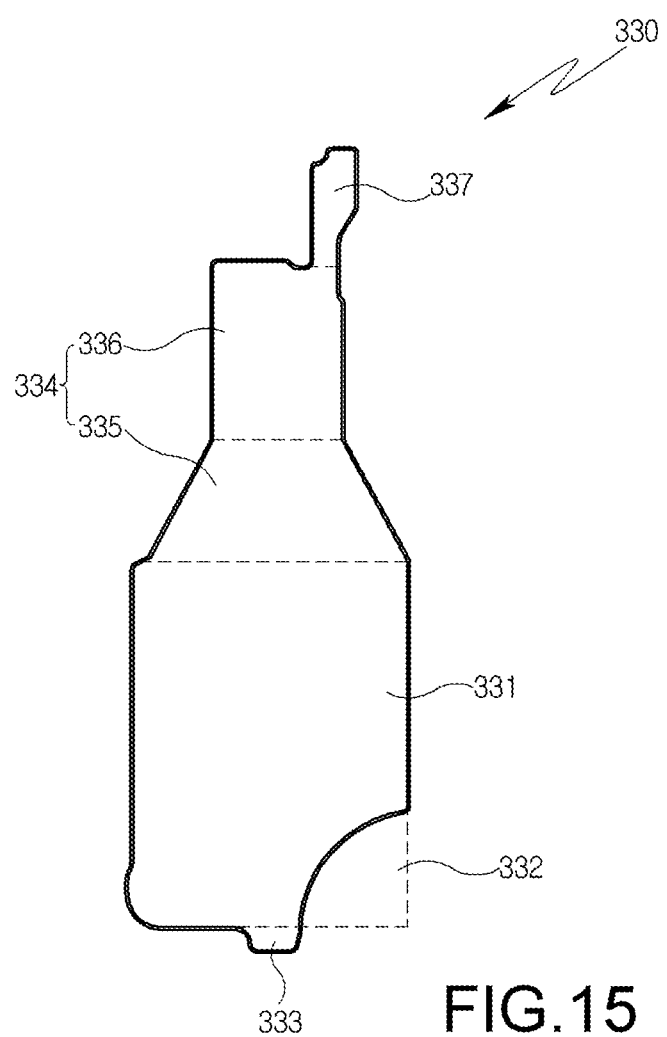
FIG. 15 is a diagram for explaining a magnetic sheet of FIG. 10.

Referring to FIG. 15, the magnetic sheet 330 is formed in a rectangular shape, and includes a base region 331 that becomes a reference region of the magnetic sheet 330.

The base region 331 is formed with a concave region 332 for preventing occurrence of the interference of the geomagnetic sensor. That is, when the magnetic sheet 330 is overlapped with the geomagnetic sensor mounted on the portable terminal, the interference occurs in the geomagnetic sensor due to the magnetic permeability of the magnetic sheet 330, thereby reducing the sensing accuracy of the geomagnetic sensor.

Therefore, in an embodiment of the present disclosure, the concave region 332 is formed in the base region 331 so that the magnetic sheet 330 is not overlapped with the geomagnetic sensor. Herein, the concave region 332 means a region where a part of the base region 331 is cut to remove the metal.

Since the rear cover 240 of the portable terminal is formed of a metal material, it shields the magnetic field emitted from the radiation patterns (i.e., the first radiation pattern 312 and the second radiation pattern 313).

The antenna module 300 is designed to have the radiation patterns (i.e., the first radiation pattern 312 and the second radiation pattern 313) or the magnetic sheet 330 disposed close to the slit 242 so that the amount of the magnetic field emitted to the outside of the portable terminal can be increased to strongly form the radiation field.

However, there is a problem in that it is difficult to dispose the magnetic sheet 330 to be close to the slit 242 because various components such as a main circuit board, a battery, a coupling and a supporting structure are disposed in the portable terminal.

Therefore, in an embodiment of the present disclosure, a lower protrusion region 333 formed to be protruded outwardly (i.e., the direction of the first slit 243) from one side of the base region 331 is formed thereon. The lower protrusion region 333 is formed to be protruded from one side in the direction of the first slit 243 among the four sides of the base region 331. The lower protrusion region 333 is disposed to be spaced at a predetermined interval apart from the first slit 243. At this time, the lower protrusion region 333 is disposed as close as possible to the first slit 243.

The width of the lower protrusion region 333 is formed to be narrower than the width of one side of the base region 331, and the protrusion position can be changed in one side according to the arrangement structure of the components of the portable terminal.

The base region 331 is formed with an overlapping region 334 that is disposed to penetrate the insertion hole 314 of the antenna sheet 310 to be overlapped with the first radiation pattern 312. At this time, the overlapping region 334 is formed to extend from the other surface of the base region 331 and disposed to face the lower protrusion region 333.

The overlapping region 334 can be divided into a first overlapping region 335 extending from the other side of the base region 331 and disposed on the rear surface of the antenna sheet 310 and a second overlapping region 336 extending from the first overlapping region 335 and disposed on the front surface of the antenna sheet 310.

The first overlapping region 335 is disposed on the rear surface of the antenna sheet 310 to be overlapped with the first radiation pattern 312 formed on the lower portion of the insertion hole 314. The second overlapping region 336 is disposed on the front surface of the antenna sheet 310 through the insertion hole 314 to be overlapped with the first radiation pattern 312 formed on the upper portion of the insertion hole 314.

At this time, the width of the second overlapping region 336 is formed at the width or less of the insertion hole 314, and the first overlapping region 335 is formed to reduce in width as it is closer to the second overlapping region 336.

For example, the first overlapping region 335 is formed in a trapezoidal shape in which the lower side is longer than the upper side, and has the lower side connected to the other surface of the base region 331 and has the upper side connected to the second overlapping region 336. At this time, the upper side of the first overlapping area 335 is formed to have a length equal to or smaller than the width of the insertion hole 314.

The second overlapping region 336 is formed to extend from the upper side of the first overlapping region 335. The second overlapping region 336 is disposed on the front surface of the antenna sheet 310 after penetrating the insertion hole 314 in the direction from the rear surface of the antenna sheet 310 to the front surface thereof.

Meanwhile, an adhesive material (not illustrated) for adhering the antenna sheet 310 and the magnetic sheet 330 can be interposed between the first overlapping region 335 and the rear surface of the antenna sheet 310 and between the second overlapping region 336 and the front surface of the antenna sheet 310.

An upper protrusion region 337 can be formed in the second overlapping region 336 in order to improve the antenna performance of the first radiation pattern 312.

The upper protrusion region 337 is formed to extend from the second overlapping region 336. At this time, the upper protrusion region 337 is formed to extend in the direction facing the first overlapping region 335. At this time, the upper protrusion region 337 is disposed as close as possible to the first slit 243. The width of the upper protrusion region 337 is formed to be narrower than the width of one side of the second overlapping region 336 connected thereto.

The upper protrusion region 337 overlaps with the second radiation pattern 313 and a part of the shielding sheet 320, and is disposed to be spaced at a predetermined interval apart from the second slit 244 of the portable terminal. At this time, the antenna module 300 according to an embodiment of the present disclosure can be disposed so that the upper protrusion region 337 of the magnetic sheet 330 is overlapped with the shielding sheet 320, and the shielding sheet 320 disposed to overlap with the upper protrusion region 337 partially operates as the auxiliary radiator of the first radiation pattern 312, thereby improving the antenna performance of the first radiation pattern 312.

Herein, in order to easily explain the magnetic sheet 330, although it has been described by dividing it into the base region 331, the lower protrusion region 333, the overlapping region 334 (i.e., the first overlapping region 335 and the second overlapping region 336), and the upper protrusion region 337, it is not limited thereto, and in the actual product, the base region 331, the lower protrusion region 333, the overlapping region 334 (i.e., the first overlapping region 335 and the second overlapping region 336), and the upper protrusion region 337 can be integrally formed.

The first step compensating sheet 340 compensates a step between the antenna sheet 310 and the magnetic sheet 330. That is, the first step compensating sheet 340 is disposed on the front surface of the magnetic sheet 330 in order to compensate the step generated between the antenna sheet 310 and the magnetic sheet 330 as the magnetic sheet 330 is penetrated and inserted into the antenna sheet 310.

The first step compensating sheet 340 is formed to have a thickness corresponding to the thickness of the antenna sheet 310. At this time, the thickness of the first step compensating sheet 340 can be formed to be the same as the thickness of the flexible board 311 of the antenna sheet 310 and the radiation pattern thereof.

The first step compensating sheet 340 is disposed in the base region 331 of the magnetic sheet 330. At this time, the first step compensating sheet 340 is disposed in some regions of the base region 331, and is disposed to be biased toward the overlapping region 334.

This is to compensate for the step caused by a sticker (e.g., a sticker for describing the battery specification) attached to the battery of the portable terminal. That is, the first step compensating sheet 340 is, for example, disposed in the base region 331 of the magnetic sheet 330, and is formed in a region except for the region overlapped with the sticker attached to the battery.

The first step compensating sheet 340 is formed with a plurality of air receiving holes 342 spaced apart from each other. The air receiving hole 342 receives the air received between the magnetic sheet 330 and the protective sheet 360 in a process of attaching the protective sheet 360, which will be described later, thereby preventing the generation of the bubble of the protective sheet 360. That is, the air receiving hole 342 performs a role of preventing the generation of the bubble of the protective sheet 360 to flatten the surface of the protective sheet 360.

The first step compensating sheet 340 is, for example, one selected from a Polyethylene Naphthalate (PEN) film, a Polyethylene Terephthalate (PET) film, a Polyimide (P1) film, a Polycarbonate (PC) film, and a Poly styrene sulfonate (PSS) film.

The second step compensating sheet 350 is disposed in the concave region 332 of the magnetic sheet 330. The second step compensating sheet 350 is formed in the same shape as the region that has been cut from the magnetic sheet 330 to be disposed in the concave region 332 in order to form the concave region 332 for preventing the interference between the geomagnetic sensor and the magnetic sheet 330. At this time, the second step compensating sheet 350 can be formed in various shapes such as a rectangular shape and a fan shape corresponding to the shape of the concave region 332.

The second step compensating sheet 350 is, for example, a resin material of one selected from a Polyethylene Naphthalate (PEN) film, a Polyethylene Terephthalate (PEN) film, a Polyimide (PI) film, a Polycarbonate (PC) film, and a Poly styrene sulfonate (PSS) film.

The protective sheet 360 is adhered to the front surfaces of the antenna sheet 310 and the magnetic sheet 330 in order to prevent the damage of the radiation pattern formed on the antenna sheet 310 and the magnetic sheet 330.

The antenna module 300 can collide with an internal structure (e.g., a battery) of the portable terminal when an impact is applied to the portable terminal. When the antenna module 300 collides with the internal structure, the magnetic sheet 330 is damaged or the characteristics of the magnetic sheet 330 are changed, thereby affecting the antenna performance.

Therefore, in an embodiment of the present disclosure, a dummy region is formed on one side portion of the antenna sheet 310 and one side portion of the magnetic sheet 330. At this time, the dummy region can include a first dummy region 318 formed on the antenna sheet 310 and a second dummy region 338 formed on the magnetic sheet 330. Herein, the first dummy region 318 is a region formed on one side portion of the antenna sheet 310, and means a region where the radiation pattern has not been formed in the entire region of the flexible board 311. The second dummy region 338 is a region formed on one side portion of the magnetic sheet 330, and means a region formed by removing a part of one side portion of the magnetic sheet 330.

The third step compensating sheet 370 is disposed on one side portion of the magnetic sheet 330, and disposed in the second dummy region 338. That is, it is possible to absorb the collision when the magnetic sheet 330 collides with the internal structure of the portable terminal, thereby preventing the damage and the change in the characteristics of the magnetic sheet 330.

At this time, the third step compensating sheet 370 is, for example, one selected from a Polyethylene Naphthalate (PEN) film, a Polyethylene Terephthalate (PEN) film, a Polyimide (PI) film, a Polycarbonate (PC) film, and a Poly styrene sulfonate (PSS) film.

The adhesive sheet 380 is a configuration for attaching the antenna module 300 to the housing of the rear surface of the portable terminal, and is adhered to the rear surfaces of the antenna sheet 310 and the magnetic sheet 330. At this time, the front surface of the adhesive sheet 380 is adhered to the rear surfaces of the antenna sheet 310 and the magnetic sheet 330. A release film, which is removed before the process of attaching the antenna module 300 to the portable terminal, is attached to the rear surface of the adhesive sheet 380. Herein, the adhesive sheet 380 can include a first adhesive sheet 380 attached to the antenna sheet 310 and a second adhesive sheet 380 attached to the magnetic sheet 330.

The portable terminal is formed with a structure for supporting a circuit board (e.g., a supporting protrusion for connecting the battery and the main circuit board), and the antenna module 300 can be disposed in the region where the structure has been formed as the size (area) of the antenna module 300 increases.

In this case, the antenna module 300 can be formed with a hole through which the structure passes, but when the hole is formed, the area capable of forming the radiation pattern can be narrowed, or the radiation pattern in a loop shape cannot be implemented, thereby not implementing the antenna performance required in the portable terminal.

Figure 16:
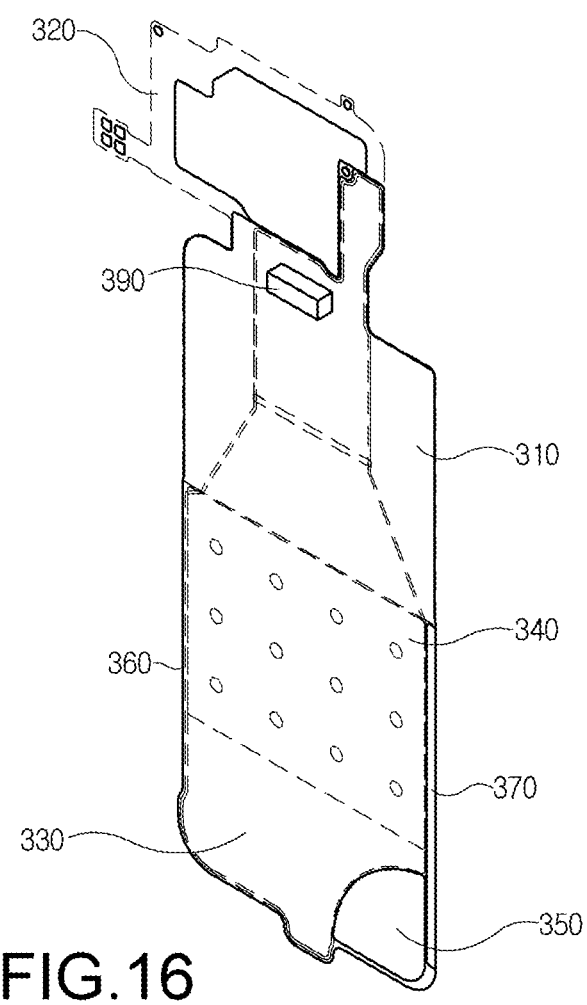
FIGS. 16 to 19 are diagrams for explaining the modified examples of the antenna module according to an embodiment of the present disclosure.

Therefore, as illustrated in FIG. 16, the antenna module 300 according to an embodiment of the present disclosure can further include a supporting member 390 for supporting the circuit board. That is, the antenna module 300 disposes the supporting member 390 protruding toward the front surface (i.e., in the direction of the circuit board) instead of forming a hole therein.

Therefore, the antenna module 300 can firmly support the circuit board while maintaining the antenna performance.

Figure 17:
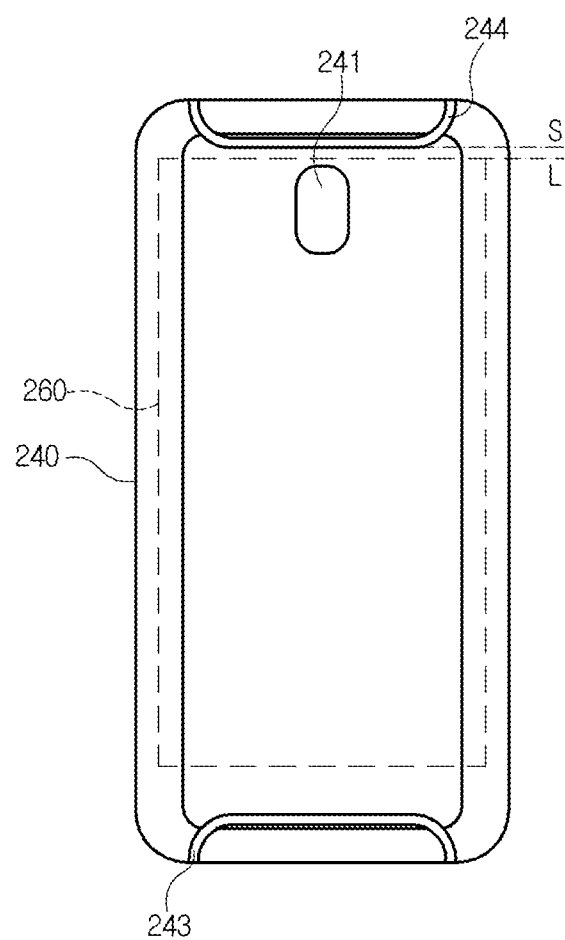

Referring to FIG. 17, in the portable terminal, the lowermost portion S of the second slit 244 is disposed to be closer to the antenna sheet 310 than the uppermost portion L of a display 260. Therefore, the radiation field formed on the rear surface of the portable terminal is weaker than the radiation field formed on the front surface thereof. That is, the magnetic field emitted from the second radiation pattern 313 firstly passes through the non-metal region of the front surface thereof before passing through the second slit 244, such that the radiation field of the rear surface thereof is weakened.

In addition, the antenna performance can be reduced by the interference between the main antenna of the portable terminal and the radiation pattern of the antenna module 300.

Figure 18:
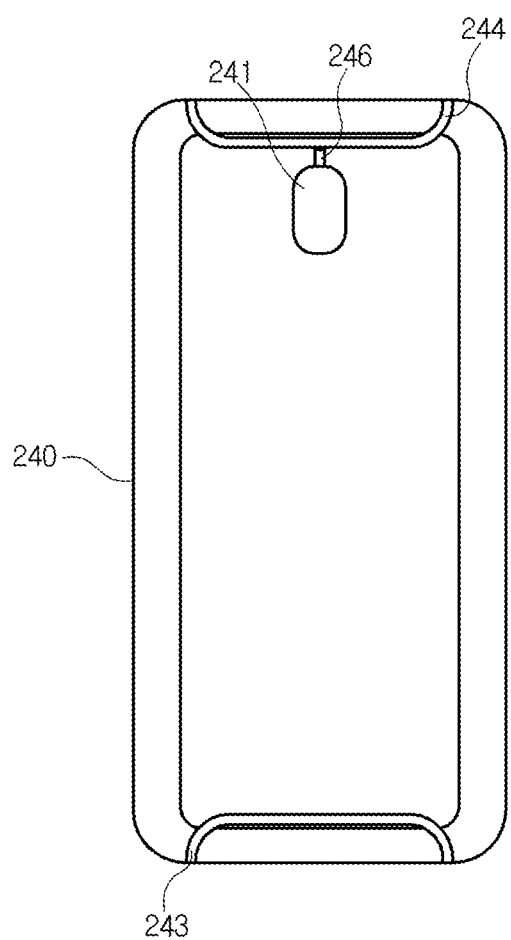

Therefore, referring to FIG. 18, a third slit 246 in the vertical direction for connecting the second slit 244 and the camera hole 241 can be formed in the rear cover 240 of the portable terminal. That is, the third slit 246 disposed to be closer to the antenna sheet 310 than the uppermost portion L of the display 260 is formed in the rear cover 240, thereby strengthening the radiation field of the rear surface thereof and minimizing the interference between the main antenna and the antenna module 300.

Figure 19:
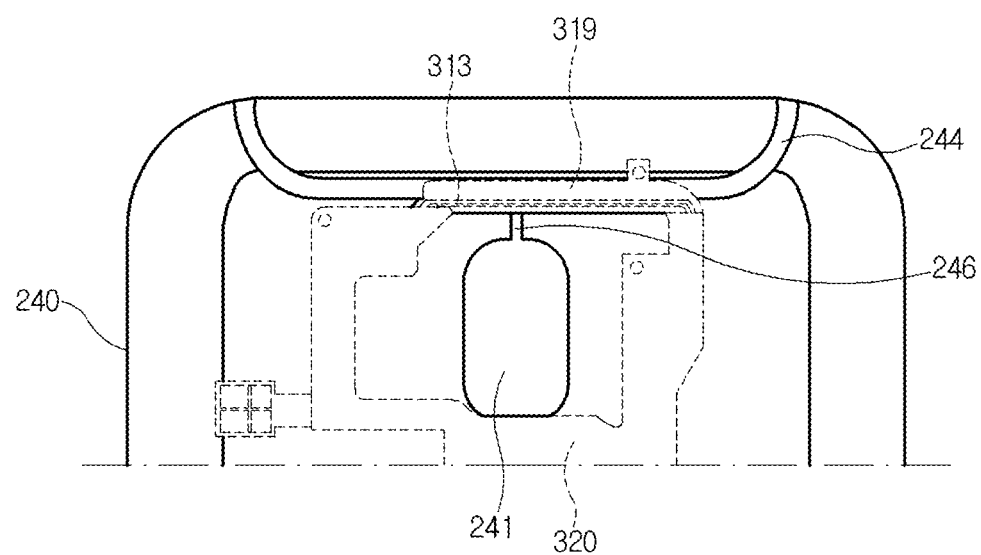

Meanwhile, referring to FIG. 19, the antenna sheet 310 can be disposed so that the second radiation pattern 313 is not overlapped in the region overlapped with the second slit 244 in order to prevent the occurrence of the interference with the main antenna. That is, a dummy space 319 where the second radiation pattern 313 is not formed in the region overlapped with the second slit 244 in the flexible board 311 is disposed in the antenna sheet 310. Herein, the second radiation pattern 313 can be formed so that an interval between the patterns is narrow in order to form the set number of turns.

The shielding sheet 320 can have the region disposed in the direction of the second slit 244 removed. That is, the shielding sheet 320 is formed along the outer circumference of the receiving hole 315, and is formed as a structure in which some regions close to the second slit 244 has been opened.

Therefore, when the slit 242 in the vertical direction is formed in the portable terminal, the antenna module 300 can remove a part of the shielding sheet 320 and form the dummy region in the antenna sheet 310, thereby preventing the reduction in the performance of the main antenna and the antenna module 300 of the portable terminal.

In addition, the antenna module 300 can maximize the recognition rate for electronic payment and near-field communication on the front surface (i.e., the direction of a display module) of the portable terminal and the rear surface (i.e., the direction of the rear cover 32) thereof by the above-described configuration. This will be described with reference to the accompanying drawings as follows.

FIG. 20 is a diagram illustrating the result of measuring the electronic payment performance (i.e., the recognition rate and the recognition range by the first radiation pattern 312) of the antenna module 300 according to an embodiment of the present disclosure.

Referring to FIG. 20, in the antenna module 300 according to an embodiment of the present disclosure, it can be seen that the recognition rate and the recognition range satisfy the reference performance for the electronic payment when the rear cover 240 formed with the slit 242 is applied.

At this time, the antenna module 300 (i.e., the antenna module 300 illustrated in FIG. 9) applied to the rear cover 240 where the third slit 246 has not been formed has a higher recognition rate and recognition range on the front surface (i.e., the direction of the display) than the rear surface (i.e., the direction of the rear cover 240).

This is because the second slit 244 of the rear cover 240 is disposed at a higher position than the non-metal region of the front surface of the portable terminal, and a stronger radiation field is formed on the front surface of the portable terminal.

Meanwhile, the antenna module 300 (i.e., the antenna module 300 illustrated in FIG. 19) applied to the rear cover 240 in which the third slit 246 has been formed has a higher recognition rate and recognition range on the rear surface thereof than the front surface thereof.

This is because the third slit 246 of the rear cover 240 is disposed at a lower position than the non-metal region of the front surface of the portable terminal, and a stronger radiation field is formed on the rear surface of the portable terminal.

FIG. 21 is a diagram illustrating the result of measuring the near-field communication performance (i.e., the recognition distance and the load modulation by the second radiation pattern 313) of the antenna module 300 according to an embodiment of the present disclosure.

Referring to FIG. 21, in the antenna module 300 according to an embodiment of the present disclosure, it can be seen that the recognition distance and the load modulation satisfy the reference performance for the near-field communication when the rear cover 240 formed with the slit 242 is applied.

At this time, since the magnetic field generated in the second radiation pattern 313 passes through the third slit 246 to form the radiation field, the loss caused by the rear cover 240 of the metal material is minimized as compared with the structure of passing through the second slit 244 to form the radiation field.

Therefore, it can be seen that the recognition distance and the load modulation performance of the antenna module 300 (i.e., the antenna module 300 illustrated in FIG. 19) applied to the rear cover 240 in which the third slit 246 has been formed are improved by about twice as compared with the antenna module 300 (i.e., the antenna module 300 illustrated in FIG. 9) applied to the rear cover 240 in which the third slit 246 has not been formed.

In addition, in the case of the antenna module 300 (i.e., the antenna module 300 illustrated in FIG. 19) applied to the rear cover 240 in which the third slit 246 has been formed, the recognition rate at the time of the near-field communication is about 57.52%, and satisfies the recognition rate condition (55% or more) required for the near-field communication.

Particularly, in the case of the antenna module 300 (i.e., the antenna module 300 illustrated in FIG. 9) applied to the rear cover 240 in which the third slit 246 has not been formed, the recognition rate at the time of the near-field communication is about 71.24%, and the recognition rate is increased by about 16% as compared with the recognition rate condition, thereby improving the near-field communication performance.

As described above, although preferred embodiments of the present disclosure have been described, it is to be understood that they can be modified into various forms, and various modifications and changes thereof can be embodied by those skilled in the art without departing from the claims of the present disclosure.

The invention claimed is:

1. An antenna module, comprising:
a flexible magnetic sheet; and
an antenna sheet on which a radiation pattern and an insertion hole are formed,
wherein the magnetic sheet is formed with an extension portion formed on one short side, and the extension portion is penetrated and inserted into the insertion hole to be coupled with the antenna sheet,
wherein the antenna sheet comprising:
a flexible printed circuit board in which a loop hole and the insertion hole are formed to be spaced apart from each other;
a radiation pattern for near-field communication formed on the flexible printed circuit board, and having a loop shape wound along an outer circumference of the loop hole; and
a radiation pattern for electronic payment formed on the flexible printed circuit board, and having a loop shape wound along an outer circumference of the insertion hole.

2. The antenna module of claim 1,
wherein the magnetic sheet is one selected from a nanocrystalline alloy ribbon sheet, an iron-based amorphous ribbon sheet, and a ferrite sheet.

3. The antenna module of claim 1,
wherein the radiation pattern for near-field communication is formed on the front surface of the flexible printed circuit board, and
wherein the radiation pattern for electronic payment is formed on at least one surface of the front surface and the rear surface of the flexible printed circuit board.

4. The antenna module of claim 1,
wherein the radiation pattern for electronic payment is wound along the outer circumference of the insertion hole, and then wound along the outer circumference of the loop hole.

5. The antenna module of claim 1, further comprising a shielding sheet disposed on the rear surface of the flexible printed circuit board, and disposed to be overlapped with the radiation pattern for near-field communication.

6. An antenna module, comprising:
a flexible magnetic sheet; and
an antenna sheet on which a radiation pattern and an insertion hole are formed,
wherein the magnetic sheet is formed with an extension portion formed on one short side, and the extension portion is penetrated and inserted into the insertion hole to be coupled with the antenna sheet,
wherein the magnetic sheet comprising:
a first region that has not been subject to a flake-treatment; and
a second region that has been subject to the flake-treatment and separated into a plurality of non-uniform fine pieces, and
wherein the area of the first region is formed to be wider than the area of the second region.

7. An antenna module mounted on a portable terminal, comprising:
an antenna sheet on which a first radiation pattern and a second radiation pattern are formed;
a shielding sheet disposed on the front surface of the antenna sheet, and overlapped with the second radiation pattern;
a magnetic sheet having one end portion disposed on the front surface and the rear surface of the antenna sheet through the antenna sheet, and having the other end portion disposed at the outside of the antenna sheet; and
a first step compensating sheet disposed on the front surface of the magnetic sheet, and for compensating a step between the antenna sheet and the magnetic sheet.

8. The antenna module of claim 7,
wherein the first step compensating sheet is formed with a plurality of air receiving holes.

9. The antenna module of claim 7,
wherein the magnetic sheet comprising:
a base region;
a lower protrusion region extending from the base region, and disposed to be spaced apart from a first slit formed in the rear cover of the portable terminal;
a first overlapping region extending from the base region to be disposed to face the lower protrusion region, and disposed on the rear surface of the antenna sheet to be overlapped with the first radiation pattern; and
a second overlapping region extending from the first overlapping region to penetrate the insertion hole of the antenna sheet, and disposed on the front surface of the antenna sheet to be overlapped with the first radiation pattern.

10. The antenna module of claim 9,
wherein the first step compensating sheet is disposed on the front surface of the base region, and disposed to be closer to the first overlapping region than the second overlapping region, and
wherein the area of the first step compensating sheet is formed to be narrower than the area of the base region.

11. The antenna module of claim 9,
wherein the magnetic sheet further comprises an upper protrusion portion extending from the second overlapping region to be disposed to face the first overlapping region, and disposed to be overlapped with the shielding sheet, and
wherein the upper protrusion portion is disposed to be spaced apart from a second slit formed in the rear cover of the portable terminal.

12. The antenna module of claim 9,
wherein the base region comprises a concave region formed in the region overlapped with a geomagnetic sensor of the portable terminal.

13. The antenna module of claim 12, further comprising a second step compensating sheet formed of a resin material and disposed in the concave region.

14. The antenna module of claim 7,
wherein the magnetic sheet is formed with a second dummy region on the same line as a first dummy region formed in the antenna sheet, and
further comprising a third step compensating sheet disposed in the second dummy region.

15. The antenna module of claim 7,
wherein the antenna sheet comprising:
a flexible board having an insertion hole and a receiving hole, into which the magnetic sheet is inserted and penetrated, formed to be spaced apart from each other;
a first radiation pattern wound along the outer circumference of the insertion hole and disposed to be overlapped with the magnetic sheet disposed on the front surface and the rear surface of the antenna sheet; and a second radiation pattern wound along the outer circumference of the receiving hole.

16. The antenna module of claim 15, wherein the second radiation pattern is disposed to be overlapped with the second slit formed in the rear cover of the portable terminal.

17. The antenna module of claim 15, wherein the receiving hole is disposed in the outer circumference of a camera hole formed in the rear cover of the portable terminal.

18. The antenna module of claim 7, further comprising a supporting member disposed on the front surface of the shielding sheet, and protruded toward the front surface of the shielding sheet to support a circuit board of the portable terminal.

19. The antenna module of claim 18, further comprising:
a protective sheet disposed on the front surface of the shielding sheet, and partially interposed between the shielding sheet and the supporting member; and
an adhesive sheet adhered to the rear surfaces of the antenna sheet and the magnetic sheet.

\* \* \* \* \*